US012748853B2

(12) United States Patent
Tahir

(10) Patent No.: US 12,748,853 B2
(45) Date of Patent: Sep. 29, 2026

(54) AUTOMATED TRIAGE OF CODE FLAWS WITH MACHINE LEARNING

(71) Applicant: Veracode, Inc., Burlington, MA (US)

(72) Inventor: Humza Tahir, Cambridge, MA (US)

(73) Assignee: Veracode, Inc., Burlington, MA (US)

( * ) Notice: Subject to any disclaimer, the term of this patent is extended or adjusted under 35 U.S.C. 154(b) by 738 days.

(21) Appl. No.: 18/181,951

(22) Filed: Mar. 10, 2023

(65) Prior Publication Data

US 2024/0303345 A1 Sep. 12, 2024

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS 8,769,696 B2 * 7/2014 Pistoia .................... G06F 21/50 726/25
9,934,385 B2 * 4/2018 Chestna .................. G06F 21/53
11,106,801 B1 * 8/2021 Levine ................ G06F 11/3692
12,074,897 B1 * 8/2024 Sánchez ................. G06N 20/00
2007/0198459 A1 * 8/2007 Boone ................. G06F 16/9535 707/E17.093
2011/0173693 A1 * 7/2011 Wysopal ............... G06F 21/577 726/19
2011/0302461 A1 * 12/2011 Goertler ................. G16H 40/40 714/57
2012/0072968 A1 * 3/2012 Wysopal ............... G06F 21/577 726/1
2014/0019386 A1 * 1/2014 Mitchell ................ G06N 20/00 706/12
2016/0110549 A1 * 4/2016 Schmitt ..................... G06F 8/77 726/25
2018/0032760 A1 * 2/2018 Hu .......................... G06F 21/71
2019/0129779 A1 * 5/2019 Adamson ............ G06F 11/3466

(Continued)

OTHER PUBLICATIONS

"Automate AppSec Triage With Machine Learning", [online], [retrieved on Mar. 9, 2023] Retrieved from the Internet: <https://www.synopsys.com/content/dam/synopsys/sig-assets/ebooks/eb-machine-learning-appsec.pdf>.

(Continued)

*Primary Examiner* — David E Choi
(74) *Attorney, Agent, or Firm* — GILLIAM IP PLLC

(57) ABSTRACT

Flaws in a codebase for an organization are triaged with a naïve Bayes classifier that determines likelihoods of triage decisions corresponding to actions (e.g., remediating via code change, deferring due to network mitigation, labeling as false positive) given the context of the flaw, application, and organization. The naïve Bayes classifier is trained on the triage outcomes of previously detected flaw instances in the codebase and provides interpretable results including feature-level likelihood scores of each triage approach. In addition to recommending the highest likelihood triage outcome provided by the naïve Bayes model, a flaw similarity model identifies previously triaged flaw instances from the organization to recommend more granular triage instructions that have been documented alongside the previous flaw instances.

20 Claims, 7 Drawing Sheets

(56) References Cited

U.S. PATENT DOCUMENTS

| | | | | |
|---|---|---|---|---|
| 2020/0057858 | A1* | 2/2020 | Sharma | G06F 21/563 |
| 2020/0162499 | A1* | 5/2020 | Alsharif | G06F 21/577 |
| 2022/0100868 | A1* | 3/2022 | Tarrant | G06N 20/00 |
| 2023/0117120 | A1* | 4/2023 | Johnson | G06F 21/552<br>726/22 |
| 2023/0409464 | A1* | 12/2023 | Sharma | G06F 11/3624 |
| 2023/0421582 | A1* | 12/2023 | McCarthy | H04L 63/1425 |
| 2024/0220636 | A1* | 7/2024 | Yi | G06F 21/57 |
| 2024/0256951 | A1* | 8/2024 | Li | G06N 20/00 |
| 2024/0303345 | A1* | 9/2024 | Tahir | G06F 21/577 |
| 2025/0245341 | A1* | 7/2025 | Malik | G06F 21/577 |
| 2025/0245566 | A1* | 7/2025 | Kawaguchi | G06F 18/2415 |

OTHER PUBLICATIONS

Jacobs, "Exploit Prediction Scoring System (EPSS)", Digital Threats: Research and Practice, vol. 2, No. 3, Article 20, Jun. 2021, 17 pages.
Millar, et al., "Optimising Vulnerability Triage in DAST with Deep Learning", AlSec'22: Proceedings of the 15th ACM Workshop on Artificial Intelligence and Security, Nov. 11, 2022, 11 pages.

* cited by examiner

AUTOMATED TRIAGE OF CODE FLAWS WITH MACHINE LEARNING

BACKGROUND

The disclosure generally relates to CPC class G06F and subclass 21/50 and/or 21/56.

Categorizations and classifications of code flaws are used to efficiently triage and handle flaws across codebases. Such categorizations include common weakness enumeration (CWE) and Common Vulnerability Scoring System (CVSS), which associates flaws with descriptions that codify the exposure of flaws and potential triage. These categorizations help organizations determine the relative severity of code flaws by providing context such as likelihood of exploitation and impact of breach. CWE and other flaw categorizations facilitate automation of flaw detection and triage.

BRIEF DESCRIPTION OF THE DRAWINGS

Embodiments of the disclosure may be better understood by referencing the accompanying drawings.

DESCRIPTION

Figure 1:
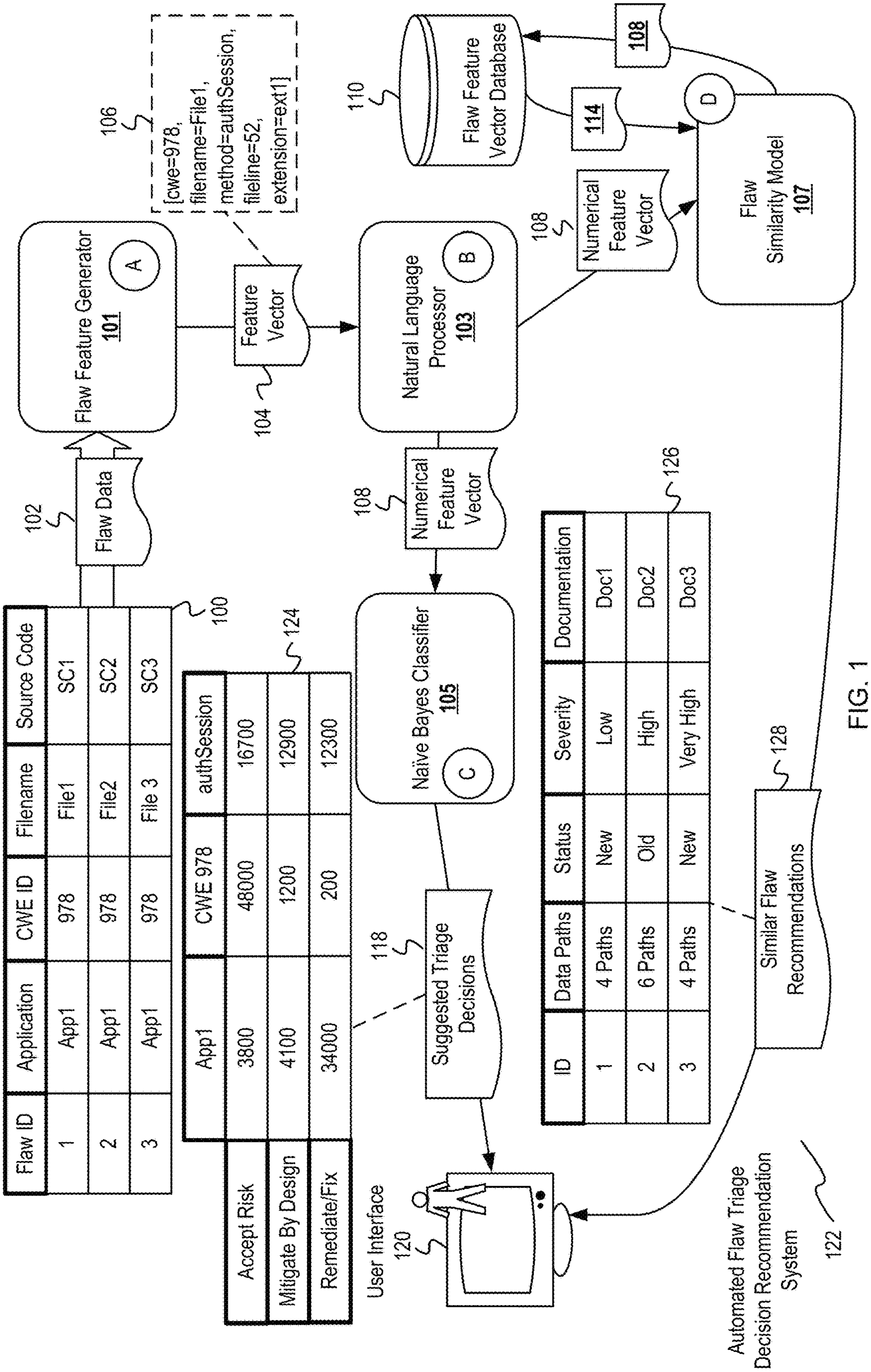
FIG. 1 is a schematic diagram of an automated flaw triage decision recommendation system using a naïve Bayes classifier and a flaw similarity model.

The description that follows includes example systems, methods, techniques, and program flows to aid in understanding the disclosure and not to limit claim scope. Well-known instruction instances, protocols, structures, and techniques have not been shown in detail for conciseness.

Overview

Proliferation of flaws in software code leads to thousands or millions of potential security vulnerabilities that are not fixed or triaged due to lack of resources for investigating each flaw. Triage is a key tool in dealing with high volume of flaws-a significant percentage of flaws can be triaged as low-priority without requiring additional inspection. However, common categorizations such as CWE and CVSS inflate severity scoring for flaws that are potentially low risk or false positives, and do not differentiate between context for flaws of same categories that can result in reduced risk and differing triage decisions. Automation of recommendations for flaw triage decisions allows for increased efficiency in determining the methods of flaw triage that an organization may pursue, such as changing code or documenting mitigating factors. Moreover, flaws often share similarity to other flaws which can suggest similar or equivalent triage decisions to those already performed on those similar flaws, such as when duplicate code is used multiple times across an organizational codebase. A naïve Bayes classifier disclosed herein is trained to determine high likelihood triage decisions for flaws. The naïve Bayes classifier is trained on data for flaws across organizations and, when specified by an organizational preference, can be trained only on flaw data for the organization or a proportion of flaw data for the organization vs flaw data for other organizations. Inputs to the naïve Bayes classifier are feature vectors comprising count vectorizations of tokens corresponding to features representative of flaws, including flaw identifiers, CWE numbers, method names, line numbers, file extensions, etc.

To supplement the high likelihood triage decisions determined by the naïve Bayes classifier, a flaw similarity model identifies similar flaws from the same organization and generates a list of recommended similar flaws. The recommended flaws are presented to a user at the organization in a dashboard along with associated data paths, flaw status, and any prior triage decisions.

Use of the naïve Bayes classifier leads to interpretable results such as frequencies of each triage decision for particular CWEs, file types, etc. This interpretability allows users to triage flaws according to their metadata which further increases efficiency of flaw triage. The proposed models and user presentation decrease manual resources needed to investigate flaws and automate triage and priority-classification of flaws under appropriate conditions.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The phrase "triage decision" refers to an action applied to a codebase that reduces or otherwise triages risk associated with a flaw in the codebase. Triage decisions, in addition to actions that triage risk by altering code to fix flaws, also include actions that ignore flaws or reduce flaw risk through configuration changes. Triage decisions comprise actions that modify code design, propose mitigating configuration changes to the environment (e.g., a network or an operating system), document existing mitigating factors, designate the flaw risk as acceptable, identify the flaws as false positives, fix flaws, report flaws to appropriate entities, etc.

Example Illustrations

FIG. 1 is a schematic diagram of an automated flaw triage recommendation system using a naïve Bayes classifier and a flaw similarity model. An automated flaw triage decision recommendation system (system) 122 recommends triage decisions for a detected flaw of an organization (not depicted) with a naïve Bayes classifier 105 and a flaw similarity model 107. The naïve Bayes classifier 105 generates a likelihood for mitigating or fixing the flaw as well as frequencies of occurrence for triage decisions per-values of metadata fields of flaws previously triaged/fixed by the organization. The flaw similarity model 107 generates recommendations of similar flaws for the organization and corresponding triage decisions as well as actions taken based on those triage decisions. The pipeline with the naïve Bayes classifier 105 and the flaw similarity model 107 is fully automated to present recommendations to a user interface 120 and, when criteria are met, apply the predicted triage decision by the naïve Bayes classifier 105 without user intervention.

FIG. 1 is annotated with a series of letters A-D. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, a flaw feature generator 101 receives flaw data 102 and generates feature vector 104 from the flaw data 102. The flaw data 102 comprise data for a flaw detected in the codebase of an organization. For instance, the flaw can be detected using static application security testing (SAST) or dynamic application security testing (DAST). Example flaw data 100 comprise the following:

| Flaw ID | Application | CWE ID | Filename | Source Code |
|---|---|---|---|---|
| 1 | App1 | 978 | File1 | SC1 |
| 2 | App1 | 978 | File2 | SC2 |
| 3 | App1 | 978 | File 3 | SC3 |

Metadata fields included in the example flaw data 100 include flaw identifiers, application identifiers, CWE identifiers, filenames, source code, and indicators of whether each flaw was triaged. Additional metadata fields such as line numbers of flaw occurrence in source code can be used.

The flaw feature generator 101 extracts tokens from the flaw data 102 to generate the feature vector 104. For the example flaw data 100, the flaw feature generator 101 generates the following example feature vector 106:

[cwe=978,
filename=File1,
method-authSession,
fileline=52,
extension=ext1]

Each entry of the example feature vector 106 is tokenized and includes identifiers of the corresponding features such as "cwe", "filename", "method", "fileline", and "extension" to associate the subsequent tokens extracted from the example flaw data 100 with the associated features for natural language processing. Additional and alternative features such as source code corresponding to the flaw can be used.

At stage B, a natural language processor 103 receives the feature vector 104 and converts the feature vector 104 to a numerical feature vector 108. For instance, the natural language processor 103 can generate count vectorizations of the feature vector 104 for each flaw as (typically sparse) vectors of 0/1 entries indicating whether the feature value for that entry is present in the feature vector 104. The count vectorizations are generated during training to include entries for feature values that occur in feature vectors of the training data. Alternatively, the natural language processor 103 can use other preprocessing techniques that preserve semantic similarity such as the word2vec algorithm or term frequency-inverse document frequency (tf-idf) statistics. The natural language processor 103 communicates the numerical feature vector 108 to the naïve Bayes classifier 105 and the flaw similarity model 107.

At stage C, the naïve Bayes classifier 105 generates suggested triage decisions 118 based on the numerical feature vector 108 for the detected flaw. The suggested triage decisions 118 comprise likelihoods of performing one of a list of actions such as accepting flaw risk, mitigating by design, potential false positives, mitigating by OS environment, mitigating by network environment, and fixing the flaw. The suggested triage decisions 118 can further indicate frequencies of previous triage decisions per-feature value in the feature vector 104 (as indicated by "1" entries in the numerical feature vector 108). Example frequencies of triage decisions 124 comprise the following:

| | App1 | CWE 978 | authSession |
|---|---|---|---|
| Accept Risk | 3800 | 48000 | 16700 |
| Mitigate By Design | 4100 | 1200 | 12900 |
| Remediate/Fix | 34000 | 200 | 12300 |

The example frequencies of triage decisions 124 indicate that for application App1, accepting risk was performed for 3800 flaws, mitigation by design was performed for 4100 flaws, and remediating/fixing was performed for 34000 flaws; for CWE 978, accepting risk was performed for 48000 flaws, mitigating by design was performed for 1200 flaws, and remediating/fixing was performed for 200 flaws; and for method authSession, accepting risk was performed for 16700 flaws, mitigating by design was performed for 12900 flaws, and remediating/fixing was performed for 12300 flaws. Consequently, CWE 978 is generally benign and strongly suggests accepting risk for a flaw, App1 strongly suggests remediating/fixing a flaw, and method authSession has less certainty as an indicator for either accepting risk, mitigating by design, or remediating/fixing a flaw. The naïve Bayes classifier 105 communicates the suggested triage decisions 118 to the user interface 120.

In some embodiments, when the likelihood of performing a triage action based on the suggested triage decisions 118 based on frequencies such as example frequencies of triage decisions 124 is sufficiently high (e.g., above a threshold selected by the security team), or the detected flaw satisfies other automation criteria, the naïve Bayes classifier 105 or other cybersecurity component performs an action corresponding to the highest likelihood triage decision. The automation criteria can comprise criteria that the CWE identifier is in a list of certain CWE identifiers (e.g., based on predetermined risk assessments of CWE identifiers), that all but one likelihood value for triage decisions are sufficiently low, that the method is in a list of certain methods, etc. The automation criteria may also be exclusionary, preventing the automation of certain flaw types and forcing manual review. A user at the user interface 120 can determine the automation criteria for the organization based on likelihoods of performing triage actions for certain feature values indicated in suggested triage decisions 118 as flaws are detected.

At stage D, the flaw similarity model 107 receives the numerical feature vector 108 and generates similar flaw recommendations 128. The flaw similarity model 107 communicates the numerical feature vector 108 to a flaw feature vector database (database) 110 and the database 110 returns candidate feature vectors 114. The database 110 applies filtering criteria to identify candidate flaws having corresponding feature vectors to include in the candidate feature vectors 114. The criteria can include that flaws have the same organization, that flaws were triaged after a designated time period prior to the present, that flaws have the same CWE identifier, that flaws have a same flaw type such as "credential management" or "cross-site scripting", that flaws are well documented, that flaws did not correspond to particular triage decisions (e.g., potential false positives), etc. In some embodiments, when computational resources are sufficiently available or the number of total flaws is sufficiently low, the database 110 returns feature vectors for every stored flaw.

The flaw similarity model 107 determines the distance between the numerical feature vector 108 and the candidate feature vectors 114. For instance, when the numerical feature vector 108 and candidate feature vectors 114 are count vectorizations, the flaw similarity model 107 determines the Manhattan distance between count vectorizations. Other distances such as Euclidean distance, cosine similarity, dot products, etc. can be used. The flaw similarity model 107 determines the top N (e.g., N=3) closest candidate flaws that are below a threshold distance to the detected flaw corresponding to the numerical feature vector 108 to include in the similar flaw recommendations 128. If there are no candidate flaws below the threshold distance, then the flaw similarity model 107 adds indications that there are no recommended flaws to the similar flaw recommendations 128.

Example similar flaw recommendations 126 comprise the following:

| ID | Data Paths | Status | Severity | Documentation |
|---|---|---|---|---|
| 1 | 4 Paths | New | Low | Doc1 |
| 2 | 6 Paths | Old | High | Doc2 |
| 3 | 4 Paths | New | Very High | Doc3 |

The "ID" field comprises an identifier of each similar flaw. The "data path" and "status" fields comprise hyperlinks to pages that describe each data path and prior triage decisions, respectively. The data paths comprise stack traces of function calls that led to each corresponding flaw, for instance as determined by SAST, and indicate lines of code for potential fixing/remediation. The "status" field indicates a length of time since the flaw was first detected. The "severity" field indicates a severity of the flaw. The "documentation" field comprises a hyperlink to triage documentation of the flaw such as prior flaw triage decisions, testing methods to verify environmental mitigation, supervising engineers, time periods for revisiting flaw triage decisions, compensating controls in effect for when flaws are mitigated, etc. The user interface 120 displays results including suggested triage decisions 118 and similar flaw recommendations 128 in a dashboard that allows for sorting by various metadata fields such as CWE identifiers, methods, etc.

Figure 2:
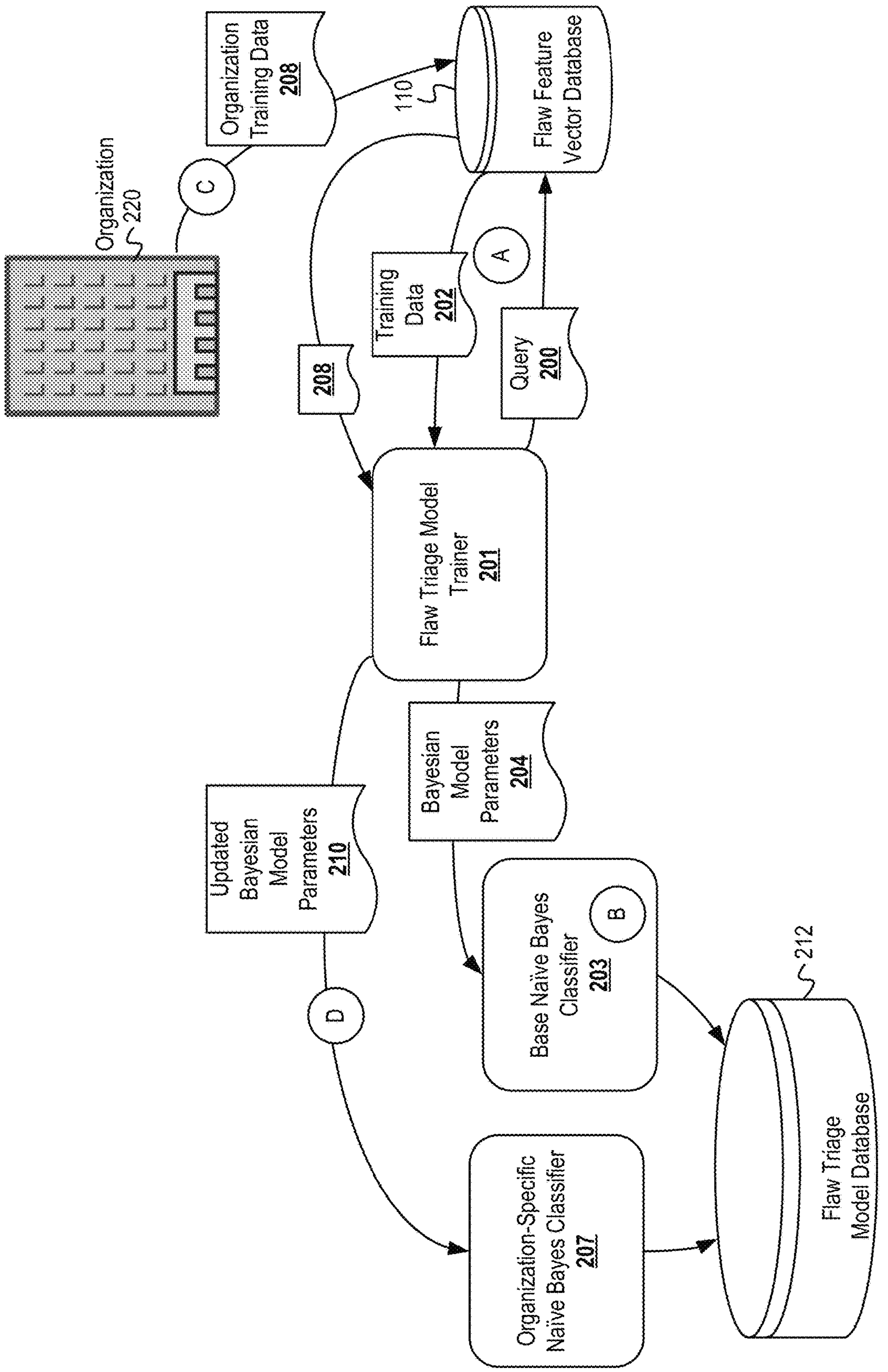
FIG. 2 is a schematic diagram of an example system for training an organization-specific naïve Bayes classifier for predicting triage decisions for flaws in an organization's codebase.

FIG. 2 is a schematic diagram of an example system for training an organization-specific naïve Bayes classifier for predicting triage decisions for flaws in an organization's codebase. For instance, the organization-specific naïve Bayes classifier can be the naïve Bayes classifier 105 in reference to FIG. 1. FIG. 2 is also annotated with a series of letters A-D. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, a flaw triage model trainer (trainer) 201 queries the database 110 with a training data query 200 for flaws in the database 110. The training data query 200 can specify filtering parameters for flaws from which to return training data, such as a prior time period during which flaws were detected (e.g., the past month), types of triage decisions performed, etc. The database 110 then applies any filters (if provided) to flaws according to its database structure and returns training data 202 for a base naïve Bayes classifier 203. The training data 202 comprise data for each flaw, which may include flaw identifiers, application identifiers, CWE identifiers, filenames, source code of the flaws, data paths of the flaws, triage decisions for the flaws, etc. The trainer 201 parses the training data 202 to extract feature vectors and generates count vectorizations of tokens in the feature vectors for each flaw. This allows for frequency analysis for fitting the base naïve Bayes classifier 203.

At stage B, the trainer 201 determines Bayesian model parameters 204 as frequencies of triage decisions for each value of each feature indicated in the count vectorizations. For instance, for a value "798" of the CWE identifier feature, the frequencies could be that the triage decision of "accept by risk" occurred 48000/(48000+1200)~98% of the time and the triage decision of "mitigated by design" occurred 1200/(48000+1200)~2% of the time. The count vectorizations can be modified for multiple (>2) classes (i.e., multiple triage decisions) by having an entry indicating the class to which a corresponding flaw belongs, and the frequencies comprise frequencies for multiple types of triage decisions on a same feature value. The base naïve Bayes classifier 203 determines frequencies of each frequency value in the training data 202 across the triage decisions. To determine a likelihood of performing a triage decision for a flaw with a count vectorization of feature values, the base naïve Bayes classifier uses the multinomial naïve Bayes formula:

$$p(k) = \frac{\left(\sum_{i=1}^{n} x_i\right)!}{\prod_{i=1}^{n} x_i!} \prod_{i=1}^{n} p_{ki}^{x_i}$$

In the above formula, $x=(x_1, \ldots, x_n)$ is a count vectorization for the flaw, $(P_{k1}, \ldots, P_{kn})$ is a vector of frequencies of each entry in count vectorizations for the kth triage decision, and p(k) is the likelihood of performing the kth triage decision. Once these frequencies are determined for each feature value across the types of triage decisions, the trainer 201 communicates the base naïve Bayes classifier 203 to a flaw triage model database 212.

At stage C, an entity or individual within the organization 220 communicates organization training data 208 to the database 110. The organization training data 208 comprises data aggregated from flaws detected in a codebase for software of the organization, for instance using SAST or DAST. The organization training data 208 can comprise source code of flaws, identifiers of flaws, filenames for the source code, metadata such as CWE identifiers for the flaws, triage decisions performed for the flaws, data paths for the flaws, etc. Upon receipt of the organization training data 208 or prompted by a request by an entity or individual of the organization 220 to generate a classifier for triage decision recommendation, the database 110 communicates the organization training data 208 to the trainer 201. The organization 220 can filter the organization training data 208 according to a preference for how much of the organization's vs other organization's data to use when training an organization-specific model. Alternatively, the organization 220 can communicate all of its data and the database 110 can filter the organization training data 208 according to preferences selected by the organizations 220, At stage D, the trainer 201 generates updated Bayesian model parameters 210 for an organization-specific naïve Bayes classifier 207. The trainer 201 extracts count vectorizations from the organization training data 208 with natural language processing. The trainer 201 generates updated Bayesian model parameters 210 according to preferences selected by the organization 220 with respect to a percentage of training data from the organization vs other organizations. For instance, the preferences can specify using the base naïve Bayes classifier 203 as the organization-specific naïve Bayes classifier 207 or can specify retraining the organization-specific naïve Bayes classifier 207 with only the organization training data 208. In some embodiments, the base naïve Bayes classifier 203 can be updated by duplicating data in the organization training data 208 or using a percentage of the organization training data 208 specified by the organization 220. Training can occur online as data from the organization 220 and other organizations is received or can occur offline on a fixed schedule (e.g., weekly, daily, etc.). Moreover, updated versions of the model can be deployed at the organization 220 (or in the cloud) online as additional training data is received or offline according to a fixed schedule or when prompted by the organization 220. The trainer 201 communicates the organization-specific naïve Bayes classifier 207 with the updated Bayesian model parameters 210 to the flaw triage model database 212.

In some embodiments, the trainer 201 can filter flaws in the training data 202 and organization training data 208 prior to generating parameters of the corresponding naïve Bayes classifiers. The trainer 201 can filter flaws with data that the organization 220 deems as low quality for determining triage decisions, for instance flaws that are not well documented, that occurred prior to a specified time period (e.g., a year), etc.

Figure 3:
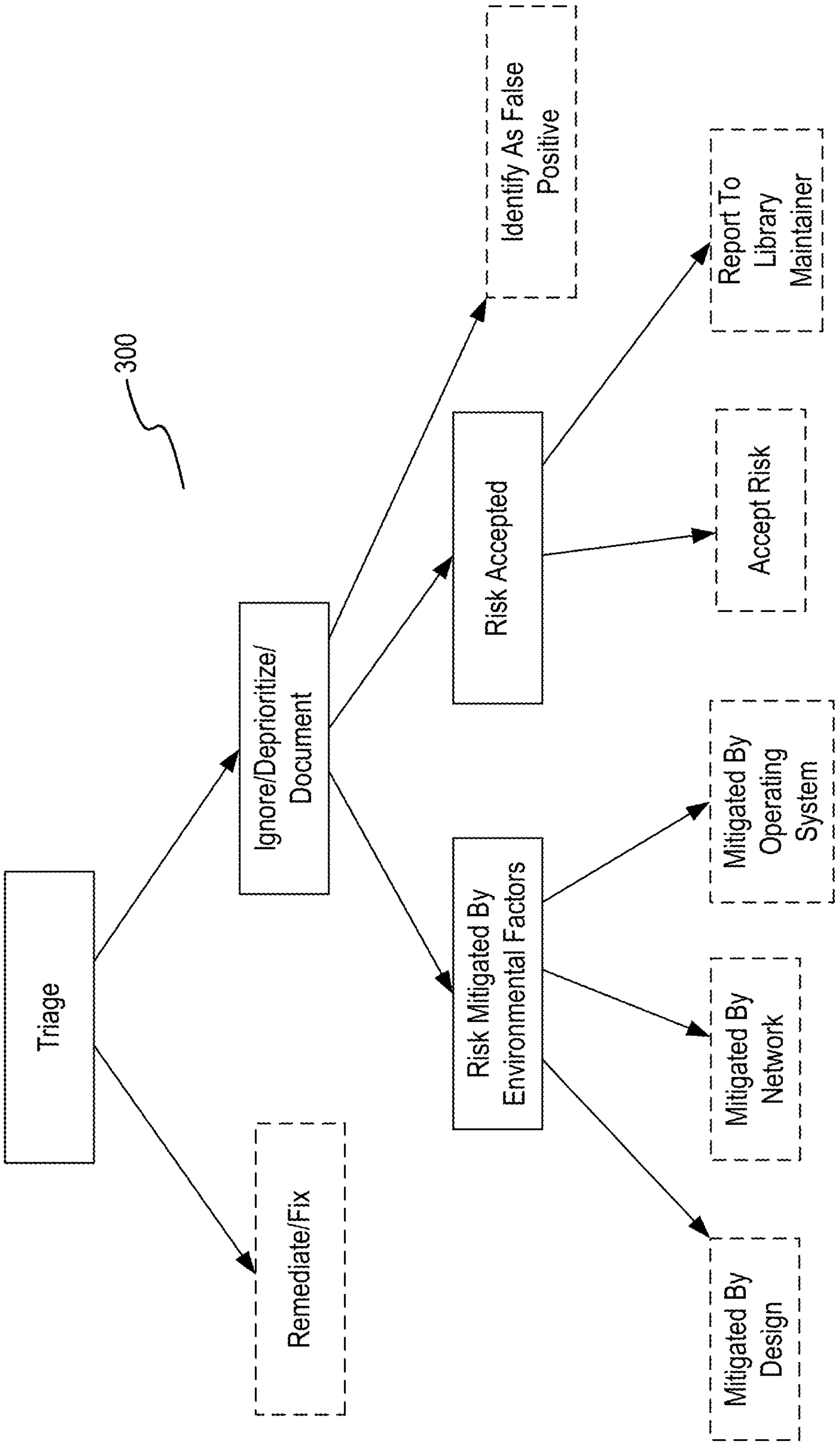
FIG. 3 is a conceptual diagram of an example decision tree for triaging flaws in a codebase.

FIG. 3 is a conceptual diagram of a decision tree for triaging flaws in a codebase. An example decision tree 300 comprises successive layers that determine classifications and actions to perform based on triaging flaws. At a base layer, a flaw is remediated/fixed or ignored/deprioritized with documentation. Remediating/fixing the flaw comprises manually fixing code to address the flaw (for instance, by modifying the flawed lines of code). Ignoring/deprioritizing the flaw comprises addressing the flaw without manual code fixes and explaining why the flaw was deprioritized. At a second layer in the example decision tree 300, the flaw is ignored/deprioritized by explaining that the risk is mitigated by environmental factors, accepting the risk, or identifying the flaw as a false positive. At a third layer in the example decision tree 300, when the flaw is explained by the risk being mitigated by environmental factors, the risk is mitigated by design, by a network associated with the flaw, or by an operating system associated with the flaw. In this context, “mitigate” means accepting that the flaw exists with the reasoning that there is a compensating control to prevent impact of risk associating with the flaw. If the risk is accepted without mitigating factors, then the risk is accepted and/or the flaw is reported to the library maintainer for possible correction in the library. While depicted as a decision tree for conceptual interpretation, in practice triage can be performed by predicting any of the inner or terminal nodes in the example decision tree 300 with a classifier.

Figure 4:
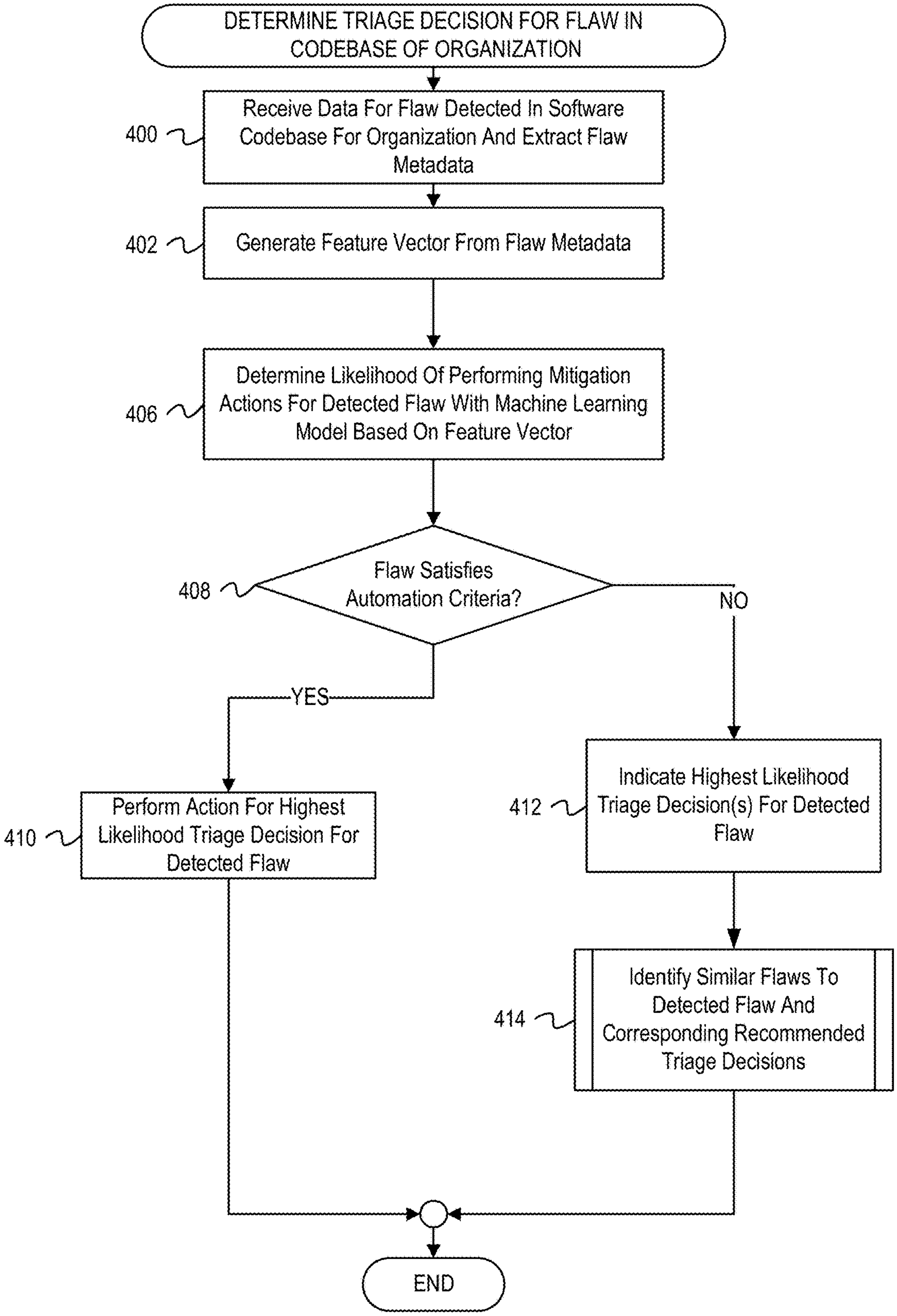
FIG. 4 is a flowchart of example operations for determining a triage decision for a flaw in a codebase of an organization.
Figure 5:
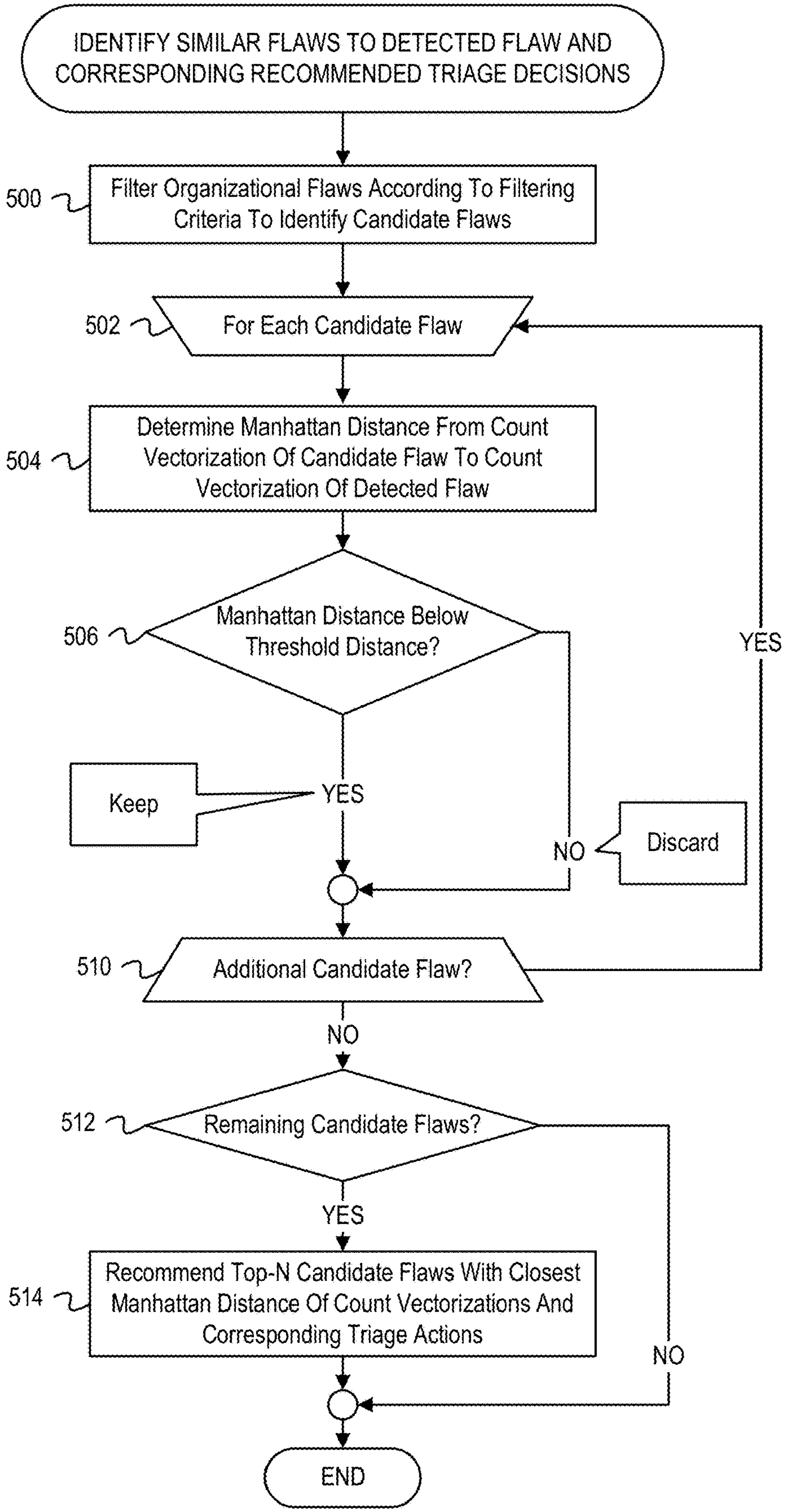
FIG. 5 is a flowchart of example operations for identifying similar flaws to a detected flaw and corresponding recommended triage decisions.
Figure 6:
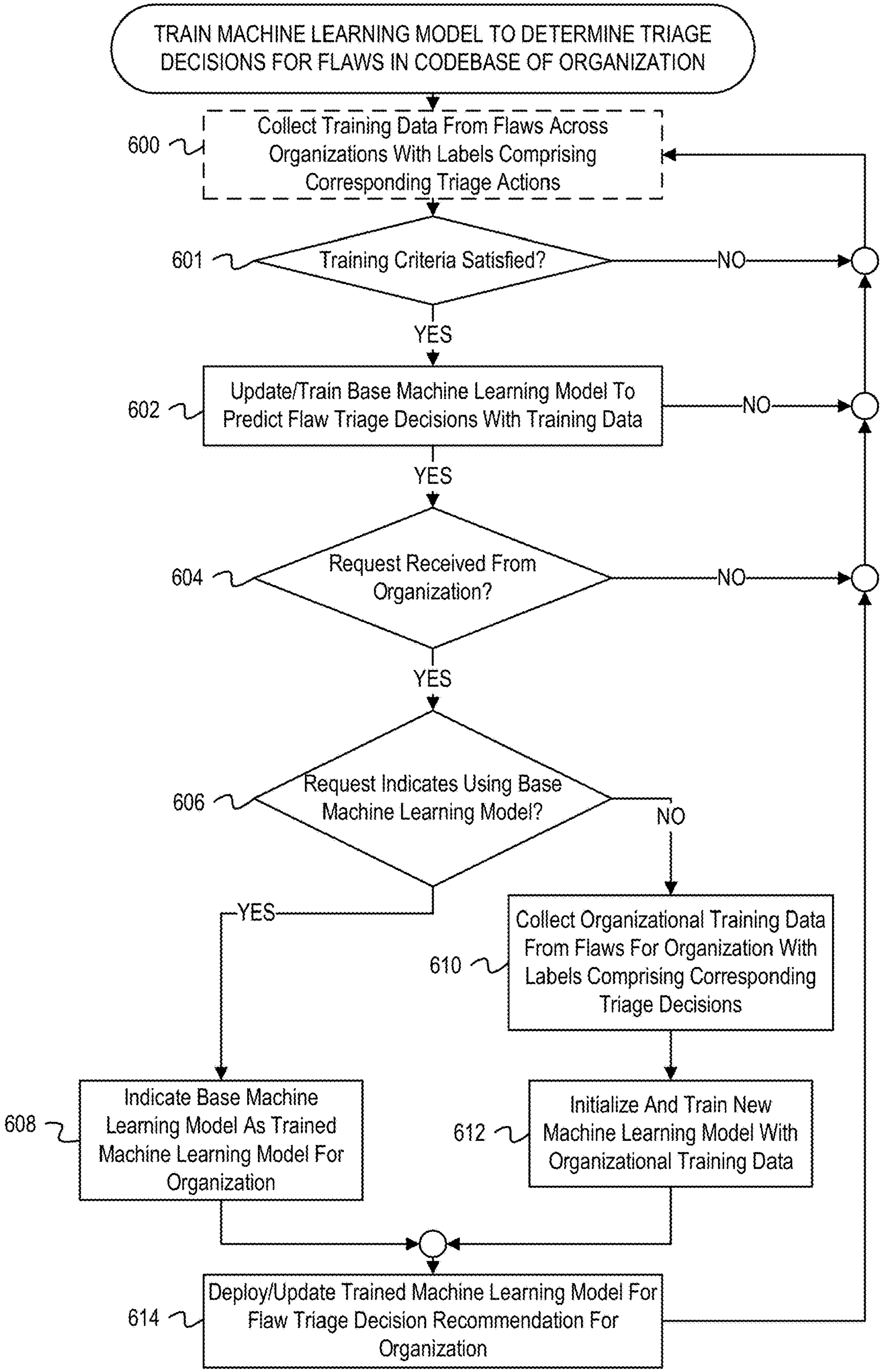
FIG. 6 is a flowchart of example operations for training a machine learning model to determine triage decisions for flaws in a codebase of an organization.

FIGS. 4-6 are flowcharts for training and deploying a pipeline of a naïve Bayes classifier and a flaw similarity model for recommending triage decisions for flaws in a codebase of an organization. The example operations are described with reference to an automated flaw triage decision recommendation system (system) and a flaw triage model trainer (trainer) for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for determining a triage decision for a flaw in a codebase of an organization. At block 400, the system receives data for a flaw detected in a software codebase for an organization and extracts flaw metadata. The flaw can be detected by the organization with SAST, DAST, SCA, or another security scanning method that enumerates flaws in software. The flaw data comprises a flaw identifier, source code corresponding to the flaw, a filename for a file containing the source code, a data path for the flaw, a CWE identifier for the flaw, etc. The flaw metadata comprise various fields extracted from the flaw data such as a method in the source code, a file line in the source code where the flaw occurs, etc.

At block 402, the system generates a feature vector from the flaw metadata. The feature vector comprises a count vectorization of feature values for the flaw metadata. The count vectorization is previously generated from feature vectors for training data to comprise a vector of length equal to the number of unique feature values from flaws in the training data. In some embodiments, the total number of feature values can be capped as the N most common feature values to shorten the length of feature vectors for flaws. Feature values may comprise a CWE identifier, a file name for the source code of the flaw, a file extension, a method, a file line for the flaw, etc. For instance, the system can use natural language processing to identify relevant tokens in the flaw data specific to each feature based on metadata of the features. The flaw data can indicate line numbers within the file for the source code where the flaw occurs to facilitate feature extraction.

At block 406, the system determines likelihoods of performing triage decisions for the detected flaw with a machine learning model based on the feature vector. For instance, when the machine learning model is a naïve Bayes classifier, the likelihoods are determined with the feature vector using the multinomial Bayes formula on frequencies of feature values for previously detected flaws.

At block 408, the system determines whether the flaw satisfies automation criteria. The automation criteria comprise criteria that determine whether to perform the highest likelihood triage decision and bypass presenting triage decision recommendations to a user. For instance, the automation criteria can comprise that the feature vector for the flaw comprises feature values such as low severity CWE identifiers, low severity methods, combinations thereof, etc. The automation criteria can comprise that a highest likelihood triage decision determined by the organization-specific naïve Bayes classifier is above a threshold likelihood. If the automation criteria are satisfied, flow proceeds to block 410. Otherwise, flow proceeds to block 412.

At block 410, the system performs the action for the highest likelihood triage decision for the detected flaw and communicates to the organization that the action for the highest likelihood triage decision for the detected flaw was performed. Implementation details for performance of each triage decision can vary per-organization. Different organizations can implement different triage decisions and can implement triage decisions in different ways. The system can further communicate an indication to a user of the organization (e.g., via a dashboard) flaw data for the triaged flaw.

At block 412, the system indicates the highest likelihood triage decision(s) for the detected flaw to a user of the organization. The system can indicate the highest likelihood triage decision(s) in a dashboard of a user interface. The dashboard can further allow the user to sort flaws by metadata, triage decisions performed, etc. Sorted flaws can indicate frequencies of triage decisions performed for previously detected flaws.

At block 414, the system identifies similar flaws to the detected flaw and corresponding recommended triage decisions. The system determines the similar flaws according to Manhattan distance between count vectorizations of previously detected flaws and the count vectorization of the detected flaw. The operations at block 414 are depicted in greater detail in reference to FIG. 5.

FIG. 5 is a flowchart of example operations for identifying similar flaws to a detected flaw and corresponding recommended triage decisions. At block 500, the system filters organizational flaws according to filtering criteria to identify candidate flaws. The filtering criteria can comprise that the flaws occurred outside of a recent time frame, that data for the flaws do not comprise certain fields (e.g., a description of the flaws), that specific triage decisions were performed, that flaws have a different CWE identifier than the detected flaw, that the flaws are for a different customer account, etc. Some or all of the filtering criteria can be specified by an organization corresponding to the organizational flaws.

At block 502, the system begins iterating through candidate flaws. For each iteration, the system retrieves a count vectorization of the candidate flaw. For instance, the system can store count vectorizations in local memory and can, at each iteration, retrieve an additional count vectorization from local memory.

At block 504, the system determines the Manhattan distance from the count vectorization of the candidate flaw to the count vectorization of the detected flaw. Alternatively, different distances can be determined. For instance, for different model inputs than count vectorizations, distances such as cosine similarity, Euclidean distance, and dot products can be determined.

At block 506, the system determines whether the Manhattan distance is below a threshold distance. The threshold distance can be determined based on inspection of similar flaw results for varying thresholds (e.g., by a domain-level expert) using previously detected flaws and corresponding triage decisions. If the Manhattan distance is below the threshold, flow proceeds to block 510 and the system keeps the candidate flaw. Otherwise, flow proceeds to block 510 and the system discards the candidate flaw.

At block 510, the system continues iterating through candidate flaws. If there is an additional candidate flaw, flow returns to block 502. Otherwise, flow proceeds to block 512.

At block 512, the system determines whether there are any remaining candidate flaws within the threshold Manhattan distance. If there are remaining candidate flaws, flow proceeds to block 514. Otherwise, the system indicates to the organization that there are no recommended similar flaws to the detected flaw and the flow in FIG. 5 is complete.

At block 514, the system recommends the top N candidate flaws with closest Manhattan distance of count vectorizations and corresponding triage decisions previously performed to the organization. The system can further communicate descriptions of the recommended flaws/triage decisions and hyperlinks to data in the descriptions such as data paths, source code, etc.

FIG. 6 is a flowchart of example operations for training a machine learning model to determine triage decisions for flaws in a codebase of an organization. At block 600, the trainer collects training data from flaws across organizations with labels comprising corresponding triage decisions. The training data comprise flaw identifiers, source code, data paths, filenames, file lines, flaw descriptions, etc. Block 600 is depicted with a dashed outline to indicate that the operations at block 600 occur in parallel with the remaining operations in FIG. 6 and continue until an external trigger (e.g., an administrator of the trainer) intervenes. The subsequent training of machine learning models in FIG. 6 can occur online as training data from one or more organizations is received and used to update models or can occur offline according to a schedule(s) specified by an organization(s) implementing the models.

At block 601, the trainer determines whether training criteria are satisfied. The training criteria can be whether a trained machine learning model has been previously deployed for an organization, whether a sufficient amount of training data has been collected, whether a time period has elapsed since prior model training, etc. If the training criteria are satisfied, flow proceeds to block 602. Otherwise, flow returns to block 600 to continue collecting training data.

At block 602, the trainer updates and/or trains a base machine learning model to predict flaw triage decisions with the training data. The trainer generates feature vectors for each flaw in the training data based on architecture of the base machine learning model. For instance, when the base machine learning model is a naïve Bayes classifier, the feature vectors comprise count vectorizations of tokens in feature values for each flaw. The count vectorizations can be truncated to include a specified number of highest frequency feature values (e.g., 1000) to improve efficiency/storage. Other types of feature vectors can be generated with other natural language processing methods depending on the type/architecture of the base machine learning model such as a random forest classifier, a neural network, a support vector machine, etc. Training also varies depending on the type of base machine learning model and, for instance for neural networks, can occur across multiple training epochs and batches. For the naïve Bayes classifier, during training the trainer computes frequencies of each feature value in the count vectorizations and uses the frequencies in the multinomial naïve Bayes formula for determining likelihoods of triage decisions.

At block 604, the trainer determines whether there is a request received from an organization to train a model for flaw triage decision recommendation. The request can specify a quantitative degree to which the base machine learning model is used in training an organization-specific machine learning model. For instance, the request can specify to use all of the training data or to use training data specific to the organization (i.e., a subset of data that correspond to the organization). The request can further specify which triage decisions to use during training, for instance, when an organization does not use certain triage decisions. If a request was received, operational flow proceeds to block 606. Otherwise, operational flow returns to block 600.

At block 606, the trainer determines whether the request indicates using the base machine learning model. The request can further indicate a percentage of training data from the organization and other organizations to use during training and/or any filters to apply to the training data according to preferences of the organization. The preferences can indicate certain metrics of quality for training data to use such as sufficient documentation of the corresponding flaws. If the request indicates using the base machine learning model, operational flow proceeds to block 608. Otherwise, operational flow proceeds to block 610.

At block 608, the trainer indicates the base machine learning model as the trained machine learning model for flaw triage recommendation at the organization. The trainer can further indicate to the organization that the base machine learning model was trained on data outside the organization as a reminder of whether the organization desires a model that can incur bias from such training.

At block 610, the trainer collects organizational training data from flaws for the organization with labels comprising corresponding triage decisions. The organizational training data can be communicated by the organization with the request or can be requested by the trainer in response to receiving the request. The trainer can filter the organizational training data according to a time period when the flaws occurred, actions corresponding to triage decisions that were performed, etc. The trainer further generates count vectorizations of feature vectors for each flaw in the organizational training data.

At block 612, the trainer initializes and trains a new machine learning model with the organizational training data. For instance, when the machine learning model is a naïve Bayes classifier, the trainer can determine frequencies of triage decisions specified by the request for feature values in the organizational training data.

At block 614, the trainer deploys the trained machine learning model for flaw triage decision recommendation for the organization. The trained machine learning model can be deployed in the cloud and the organization can communicate detected flaws to the cloud for determining which triage decisions to perform. Alternatively, the trained machine learning model can be deployed on endpoint devices at the organization to bypass communications of detected flaws via the Internet. The trained machine learning model can be configured once deployed to ignore and/or audit flaws that correspond to certain flaw triage decisions undesired by the organization such as “accept the risk”.

Training of machine learning models for triage decision recommendation of flaws in the foregoing operation of FIG. 6 are described as occurring based on a request from an organization. Training can occur online or offline as training data is collected by the trainer and can occur independent of requests by the organization, for instance as training data is collected by the trainer for online training or according to a fixed schedule for offline training.

Variations

The foregoing disclosure refers variously to using naïve Bayes classifier to determine likelihoods of performing triage decisions for detected flaws and using Manhattan distance between feature vectors of flaws to determine flaw similarity. Any predictive machine learning model such as random forest classifiers, representative centroids from k-nearest neighbors clustering, neural networks, semi-supervised learning models, self-supervised learning models, etc. can be implemented. The output can correspond to multiple triage decisions and/or can corresponding to a binary variable indicating whether or not the triage decision was to ignore the flaw or fix the flaw. Different methods of preprocessing from count vectorization and different features can be implemented for varying models/model architectures.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 504 and 506 can be performed in parallel or concurrently. With respect to FIG. 5, filtering organizational flaws to identify candidate flaws may not be necessary depending on available computational resources. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a “circuit,” “module” or “system.” The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
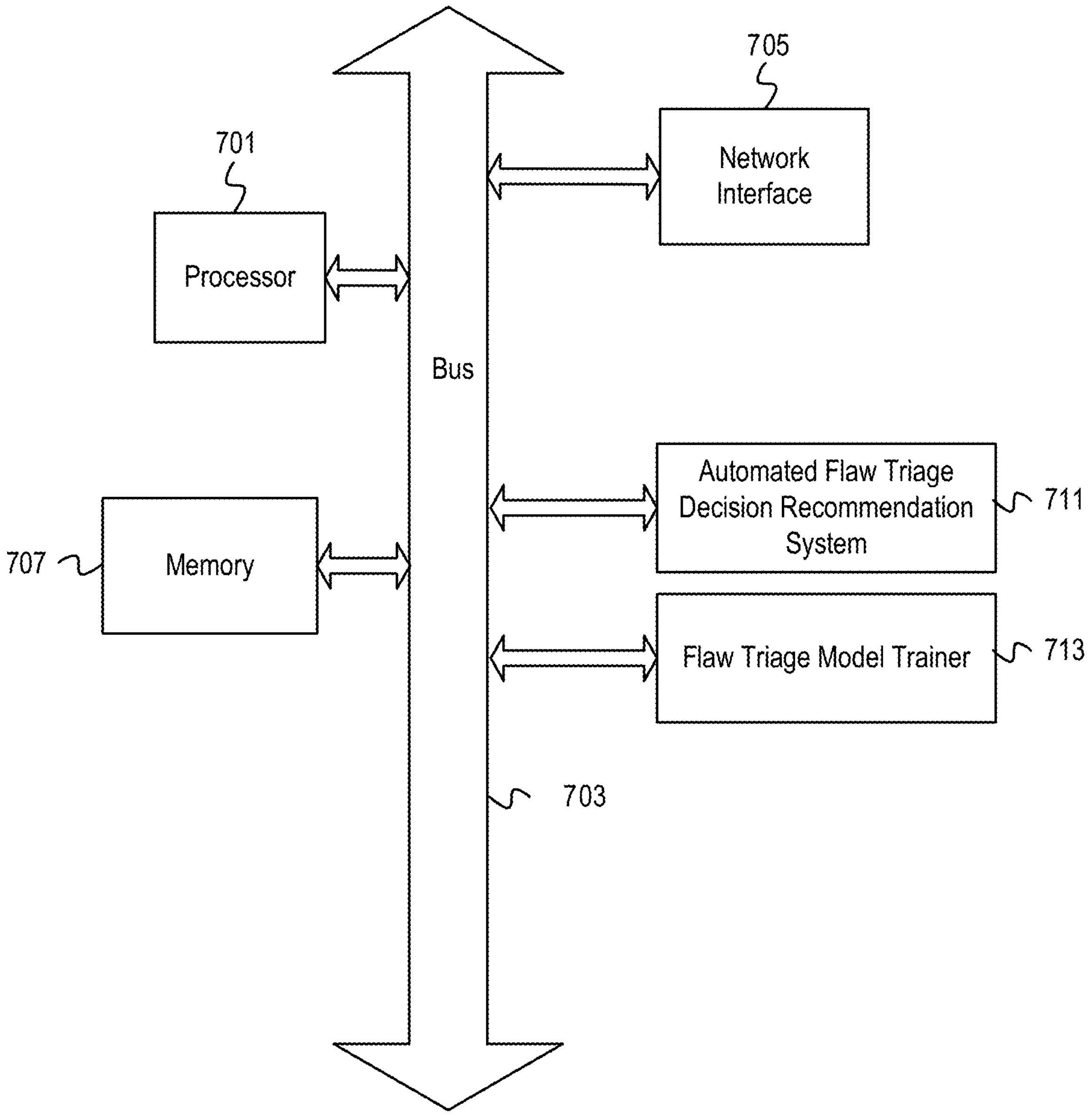
FIG. 7 depicts an example computer system with an automated flaw triage decision recommendation system and a flaw triage model trainer.

FIG. 7 depicts an example computer system with an automated flaw triage decision recommendation system and a flaw triage model trainer. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes an automated flaw triage decision recommendation system (system) 711 and a flaw triage model trainer (trainer) 713. The system 711 determines likelihood values of performing triage decisions for a detected flaw for a codebase of an organization based on inputting a count vectorization of values of features for data for the detected flaw into a naïve Bayes classifier. The system 711 additionally determines flaws for the organization with similar count vectorizations to the detected flaw and recommends triage decisions performed for those similar flaws. The trainer 713 trains the naïve Bayes classifier with training data specific to the organization and, when requested, flaw data across organizations along with corresponding triage decisions performed for those flaws. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:
- generating a feature vector from data for a flaw detected in a codebase of an organization;
- inputting the feature vector into a machine learning model to obtain from output a plurality of likelihoods of performing each of a plurality of triage decisions in response to detecting the flaw, wherein the machine learning model was trained to output likelihoods of each of the plurality of triage decisions for flaws previously detected by the organization;
- identifying a subset of previously detected flaws for the organization as candidate flaws for similarity to the flaw in the codebase of the organization;
- determining similarity between one or more feature vectors for each of the candidate flaws and the feature vector for the flaw; and
- indicating one or more of the triage decisions corresponding to highest one or more of the plurality of likelihoods and top N of the candidate flaws with highest similarity to the flaw as similar flaws for triage decisions.

2. The method of claim 1, wherein the machine learning model comprises a naïve Bayes classifier.

3. The method of claim 2, further comprising indicating frequency of each of the plurality of triage decisions for previously detected flaws in the codebase of the organization corresponding to feature vectors having at least one feature value matching the feature vector for the flaw.

4. The method of claim 1, wherein the feature vector comprises a count vectorization of tokens in features of the data for the flaw.

5. The method of claim 4, wherein the features of the data for the flaw comprise at least one of a common weakness enumeration identifier, a method, a filename, a file line, and a file extension.

6. The method of claim 1, wherein indicating the top N of the candidate flaws with highest similarity to the flaw comprises recommending one or more triage decisions performed for at least a subset of the top N of the candidate flaws.

7. The method of claim 1, wherein the feature vectors for the candidate flaws and the flaw comprise count vectorizations of tokens in features of data for respective flaws, and wherein determining similarity between one or more feature vectors for each of the candidate flaws and the feature vector for the flaw comprises determining a distance between each of the one or more feature vectors for the candidate flaws and the feature vector for the flaw.

8. A non-transitory machine-readable medium having program code stored thereon, the program code comprising instructions to:
- receive indications of a flaw detected in a codebase of an organization;
- generate a feature vector from the indications of the flaw;
- input the feature vector into a machine learning model to output plurality of likelihoods of triaging the flaw with each of a plurality of triage decisions, wherein the machine learning model was trained to output likelihoods of triaging previous flaws in the codebase of the organization with each of the plurality of triage decisions;
- identify a subset of previously detected flaws for the organization as candidate flaws for similarity to the flaw in the codebase of the organization;
- determine similarity between one or more feature vectors for each of the candidate flaws and the feature vector for the flaw; and
- indicate one or more triage decisions in the plurality of triage decisions with a highest likelihoods in the plurality of likelihoods for triage of the flaw and top N of the candidate flaws with highest similarity to the flaw as similar flaws for triage decisions.

9. The non-transitory machine-readable medium of claim 8, wherein the machine learning model comprises a naïve Bayes classifier.

10. The non-transitory machine-readable medium of claim 9, wherein the program code further comprises instructions to indicate a frequency of each of the plurality of triage decisions for previously detected flaws in the codebase of the organization corresponding to feature vectors having at least one feature value matching the feature vector for the detected flaw.

11. The non-transitory machine-readable medium of claim 8, wherein the feature vector comprises a count vectorization of tokens in features of flaw.

12. The non-transitory machine-readable medium of claim 8, wherein the instructions to indicate the top N of the candidate flaws with highest similarity to the flaw comprise instructions to recommend one or more triage decisions performed for at least a subset of the top N of the candidate flaws.

13. An apparatus comprising:

a processor; and a machine-readable medium having instructions stored thereon that are executable by the processor to cause the apparatus to, train a machine learning model to determine likelihoods of performing each of a plurality of triage decisions for flaws previously detected in a codebase of an organization;

based on detecting a flaw in the codebase of the organization, determine a plurality of likelihoods of performing the plurality of triage decisions for the flaw with the trained machine learning model;

identify a subset of previously detected flaws for the organization as candidate flaws for similarity to the flaw in the codebase of the organization;

determine similarity between one or more feature vectors for each of the candidate flaws and the feature vector for the flaw; and indicate one or more of the plurality of triage decisions with highest likelihoods in the plurality of likelihoods for triage of the flaw and a top N of the candidate flaws with highest similarity to the flaw as recommended similar flaws for triage decision.

14. The apparatus of claim 13, wherein the machine learning model comprises a naïve Bayes classifier.

15. The apparatus of claim 14, wherein the machine-readable medium further has stored thereon instructions executable by the processor to cause the apparatus to indicate a frequency of each of the plurality of triage decisions for previously detected flaws in the codebase of the organization having at least one feature value matching a feature value of the flaw.

16. The apparatus of claim 14, wherein the instructions to determine a plurality of likelihoods of performing the plurality of triage decisions for the flaw with the machine learning model comprise instructions executable by the processor to cause the apparatus to, generate a feature vector comprising a count vectorization of feature values from data for the flaw; and input the feature vector into the naïve Bayes classifier to output the plurality of likelihoods.

17. The apparatus of claim 13, wherein the instructions to indicate the top N of the candidate flaws with highest similarity to the flaw comprise instructions executable by the processor to cause the apparatus to recommend one or more triage decisions performed for at least a subset of the top N of the candidate flaws.

18. The method of claim 1, further comprising:

determining whether a remediation criterion/criteria for the flaw has been met; and based on determining that the remediation criterion/criteria has been met, performing a corresponding triage action associated with a highest likelihood triage action determined for the flaw.

19. The non-transitory machine-readable medium of claim 8, wherein the feature vectors for the candidate flaws and the flaw comprise count vectorizations of tokens in features of data for respective flaws, and wherein the instructions to determine similarity between one or more feature vectors for each of the candidate flaws and the feature vector for the flaw comprise instructions to determine a distance between each of the one or more feature vectors for the candidate flaws and the feature vector for the flaw.

20. The apparatus of claim 13, wherein the feature vectors for the candidate flaws and the flaw comprise count vectorizations of tokens in features of data for respective flaws, and wherein the instructions executable by the processor to determine similarity between one or more feature vectors for each of the candidate flaws and the feature vector for the flaw comprise instructions executable by the processor to cause the apparatus to determine a distance between each of the one or more feature vectors for the candidate flaws and the feature vector for the flaw.

* * * * *